US012606651B2

(12) United States Patent
Ichimoto et al.

(10) Patent No.: US 12,606,651 B2
(45) Date of Patent: Apr. 21, 2026

(54) RUBBER COMPOSITION AND TIRE

(71) Applicant: SUMITOMO RUBBER INDUSTRIES, LTD., Hyogo (JP)

(72) Inventors: Yamato Ichimoto, Hyogo (JP); Kensuke Washizu, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 849 days.

(21) Appl. No.: 17/765,115

(22) PCT Filed: Sep. 23, 2020

(86) PCT No.: PCT/JP2020/035778
§ 371 (c)(1),
(2) Date: Mar. 30, 2022

(87) PCT Pub. No.: WO2021/065615
PCT Pub. Date: Apr. 8, 2021

(65) Prior Publication Data
US 2022/0403069 A1      Dec. 22, 2022

(30) Foreign Application Priority Data

Oct. 2, 2019    (JP) ................................. 2019-182373

(51) Int. Cl.
| | |
|---|---|
| *C08F 36/06* | (2006.01) |
| *B60C 1/00* | (2006.01) |
| *C08C 19/36* | (2006.01) |
| *C08F 212/08* | (2006.01) |
| *C08K 3/36* | (2006.01) |
| *C08K 5/3445* | (2006.01) |
| *C08L 9/00* | (2006.01) |
| *C08L 9/06* | (2006.01) |
| *C08L 13/00* | (2006.01) |

(52) U.S. Cl.
CPC ............ *C08F 36/06* (2013.01); *B60C 1/0016* (2013.01); *C08C 19/36* (2013.01); *C08F 212/08* (2013.01); *C08K 3/36* (2013.01); *C08K 5/3445* (2013.01); *C08L 9/00* (2013.01); *C08L 9/06* (2013.01); *C08L 13/00* (2013.01)

(58) Field of Classification Search
CPC ...... C08L 9/00; C08L 9/06; C08L 9/08; C08L 9/10; C08L 13/00; C08L 13/02; C08F 236/14
See application file for complete search history.

(56) References Cited

U.S. PATENT DOCUMENTS

| | | | |
|---|---|---|---|
| 9,758,707 B2 | 9/2017 | Ichikawa | |
| 2006/0089451 A1 | 4/2006 | Nakazono et al. | |
| 2009/0215941 A1 | 8/2009 | Nakazono et al. | |
| 2010/0130663 A1 | 5/2010 | Taguchi et al. | |
| 2017/0174001 A1* | 6/2017 | Miyazaki | B60C 1/0016 |
| 2019/0031864 A1 | 1/2019 | Kato | |
| 2021/0230396 A1* | 7/2021 | Nakahata | B60C 1/0016 |

FOREIGN PATENT DOCUMENTS

| | | | | |
|---|---|---|---|---|
| CA | 2013319 A1 * | 9/1990 | ............ | C08K 5/098 |
| EP | 2311907 A1 | 4/2011 | | |
| EP | 2692790 A1 | 2/2014 | | |
| EP | 2716700 A1 | 4/2014 | | |
| EP | 3332988 A1 | 6/2018 | | |
| EP | 3345775 A1 | 7/2018 | | |
| JP | H8-151482 A | 6/1996 | | |
| JP | 2006-124423 A | 5/2006 | | |
| JP | 2007-321126 A | 12/2007 | | |
| JP | 2008-285524 A | 11/2008 | | |
| JP | 2013-100449 A | 5/2013 | | |
| WO | WO-2020022324 A1 * | 1/2020 | ........... | B60C 1/0016 |

OTHER PUBLICATIONS

Partial machine translation of JP 2013-100449 A (Year: 2013).*
Partial machine translation of JP 2007-321126 A (Year: 2007).*
ISR for PCT/JP2020/035778, dated Dec. 8, 2020.
Written Opinion for PCT/JP2020/035778, dated Dec. 8, 2020 (w/ translation).

* cited by examiner

*Primary Examiner* — Kregg T Brooks
(74) *Attorney, Agent, or Firm* — Greenblum & Bernstein, P.L.C.

(57) ABSTRACT

The present disclosure provides a rubber composition and a tire which provide improved overall performance in terms of wet performance and dry performance. The present disclosure relates to a rubber composition, containing at least one polybutadiene rubber and/or at least one styrene-butadiene rubber, having a complex modulus E* that reversibly changes with water, and satisfying the following relationships 1) to 3): 1) Complex modulus E* when water-wet/ Complex modulus E* before water-wet×100≤98 wherein E* represents the E* at 23° C. of the rubber composition; 2) 99≤Complex modulus E* after water-wet and dehydrated/ Complex modulus E* before water-wet×100≤100 wherein E* represents the E* at 23° C. of the rubber composition; 3) 99≤Volume when water-wet/Volume before water-wet× 100≤100 wherein Volume represents the volume at 23° C. of the rubber composition.

20 Claims, No Drawings

RUBBER COMPOSITION AND TIRE

TECHNICAL FIELD

The present disclosure relates to a rubber composition and a tire.

BACKGROUND ART

In recent years, safety has become an increasingly important issue for all automobiles. This has created a need for further improving wet grip performance. Various researches have been made to date to improve wet grip performance, and a variety of inventions directed to silica-containing rubber compositions have been reported (for example, Patent Literature 1). Wet grip performance may be greatly affected particularly by the properties of the rubber composition of the tread portion that contacts the road. Thus, a wide range of technical improvements in rubber compositions for tire components such as treads have been proposed and put into practical use.

CITATION LIST

Patent Literature

Patent Literature 1: JP 2008-285524 A

SUMMARY OF INVENTION

Technical Problem

As a result of extensive studies, the present inventors have found that, although the wet grip performance of tires has greatly advanced with the technical improvements of silica-containing rubber compositions for treads, there still remains the major technical problem of changes in grip performance caused by, for example, changes in road conditions from dry to wet road or from wet to dry road, and thus room for improvement exists.

The inventors has extensively investigated this problem and found that, when conventional rubber compounds change from a dry state where they are not wet with water to a so-called wet state where they are wet with water, they will not change in hardness or will become harder due to cooling with water. Thus, the road contact area may be reduced and therefore the wet grip performance tends to be reduced compared to the dry grip performance. The inventors have also found that handling stability under wet conditions tends to be reduced for the same reason as mentioned above. It has also been found that although a known method for improving wet performance is to incorporate a softener to soften the rubber, the softened rubber may give rise to the problem of deteriorated rolling resistance on a dry road.

Hence, it has been found that the conventional techniques leave room for improvement to improve overall performance in terms of wet performance (e.g., wet grip performance) and dry performance (e.g., dry grip performance, dry rolling resistance).

The present disclosure aims to solve the above problem and provide a rubber composition and a tire which provide improved overall performance in terms of wet performance and dry performance.

Solution to Problem

The present disclosure relates to a rubber composition, containing at least one selected from polybutadiene rubbers or styrene-butadiene rubbers, having a complex modulus E* that reversibly changes with water, and satisfying the following relationships 1) to 3):

$$\text{Complex modulus } E^* \text{ when water-wet/Complex modulus } E^* \text{ before water-wet} \times 100 \leq 98 \qquad \text{1)}$$

wherein E* represents the E* at 23° C. of the rubber composition;

$$99 \leq \text{Complex modulus } E^* \text{ after water-wet and dehydrated/Complex modulus } E^* \text{ before water-wet} \times 100 \leq 100 \qquad \text{2)}$$

wherein E* represents the E* at 23° C. of the rubber composition;

$$99 \leq \text{Volume when water-wet/Volume before water-wet} \times 100 \leq 100 \qquad \text{3)}$$

wherein Volume represents the volume at 23° C. of the rubber composition.

Preferably, rubber molecules of at least one rubber component are partially or fully cross-linked by ionic bonding.

Preferably, the rubber composition contains, per 100 parts by mass of at least one rubber component therein, at least 1.0 part by mass of at least one selected from the group consisting of carbon black and silica.

Preferably, the rubber composition contains, per 100 parts by mass of at least one rubber component therein, 15 to 70 parts by mass of silica.

Preferably, the rubber composition contains: at least one selected from the group consisting of carboxylic acid-modified styrene-butadiene rubbers and carboxylic acid-modified polybutadiene rubbers; and at least one compound containing at least one selected from the group consisting of metal elements, metalloid elements, and a nitrogen element.

Preferably, the rubber composition contains, per 100 parts by mass of at least one rubber component therein, 1 to 50 parts by mass of at least one resin.

Preferably, the rubber composition contains, per 100 parts by mass of at least one rubber component therein, at least 15 parts by mass of at least one plasticizer.

Preferably, the rubber composition satisfies the following relationship with respect to a silica content and a plasticizer content each per 100 parts by mass of at least one rubber component in the rubber composition:

Plasticizer content/Silica content<1.0.

Preferably, the rubber composition satisfies the following relationship with respect to a silica content and a resin content each per 100 parts by mass of at least one rubber component in the rubber composition:

Resin content/Silica content<1.0.

Preferably, the rubber composition is for use in treads.

The present disclosure also relates to a tire, including a tire component at least partially including the rubber composition.

Advantageous Effects

The rubber composition of the present disclosure contains at least one polybutadiene rubber and/or styrene-butadiene rubber, has a complex modulus E* that reversibly changes with water, and satisfies relationships 1) to 3). Such a rubber composition provides improved overall performance in terms of wet performance and dry performance.

DESCRIPTION OF EMBODIMENTS

The rubber composition of the present disclosure contains at least one polybutadiene rubber and/or styrene-butadiene rubber, has a complex modulus E* that reversibly changes with water, and satisfies the relationships 1) to 3) below. Thus, it is possible to improve overall performance in terms of wet performance and dry performance.

$$\text{Complex modulus } E^* \text{ when water-wet/Complex}$$
$$\text{modulus } E^* \text{ before water-wet} \times 100 \leq 98 \qquad 1)$$

wherein E* represents the E* at 23° C. of the rubber composition $$99 \text{ Complex modulus } E^* \text{ after water-wet and dehy-}$$
$$\text{drated/Complex modulus } E^* \text{ before water-wet} \times$$
$$100 \leq 100 \qquad 2)$$

wherein E* represents the E* at 23° C. of the rubber composition $$99 \text{ Volume when water-wet/Volume before water-}$$
$$\text{wet} \times 100 \leq 100 \qquad 3)$$

wherein Volume represents the volume at 23° C. of the rubber composition

The problem (purpose) of the present disclosure is to improve overall performance in terms of wet performance (e.g., wet grip performance) and dry performance (e.g., dry grip performance, dry rolling resistance). A solution to solve the problem is to formulate a rubber composition containing at least one styrene-butadiene rubber (SBR) and/or polybutadiene rubber (BR) to have a complex modulus E* that reversibly changes with water, and satisfy relationships 1) to 3). In other words, the essential feature of the present disclosure is to formulate a rubber composition containing SBR and/or BR to have a complex modulus E* that reversibly changes with water and satisfy relationships 1) to 3).

The rubber composition provides the above-described effect. The reason for this advantageous effect is not exactly clear but is believed to be as follows.

The rubber composition of the present disclosure contains SBR and/or BR as rubber components, has a complex modulus E* that reversibly changes with water, and satisfies relationships 1) and 2). Here, relationship 1) indicates that the E* of the rubber composition when wet with water is reduced to 98% or lower relative to the E* (100%) of the rubber composition before wet with water (the initial dry rubber composition before water-wet). Moreover, relationship 2) indicates that the E* of the rubber composition obtained after further redrying the water-wet rubber composition has returned within the range of 99 to 100% relative to the E* (100%) of the rubber composition before wet with water. In other words, by "the rubber composition of the present disclosure has a complex modulus E* that reversibly changes with water, and satisfies relationships 1) and 2)", it is meant that the complex modulus (E*) of the composition swelled with water is reduced compared to the complex modulus (E*) of the initial dry composition before water-wet, and the complex modulus (E*) of the composition further redried has returned to roughly the initial E*, and thus that the E* reversibly changes in the presence of water.

Accordingly, when the road conditions change from dry to wet, the rubber composition gets wet with water and thereby has a reduced complex modulus E*, which makes it possible to reduce a decrease in wet grip performance, resulting in good wet performance. This is believed to be because if the E* remains suitable for dry roads, sufficient grip performance cannot be obtained on wet roads where skidding is more likely to occur; in contrast, a reduced E* leads to an increased road contact area, which makes it possible to reduce a decrease in wet grip performance, resulting in good wet performance (e.g., wet grip performance).

On the other hand, when the road conditions change from wet to dry, the water-wet rubber composition gets dry and thereby has an increased (returned) E*, which makes it possible to maintain rolling resistance during running on dry roads to ensure good fuel economy. It is also possible to reduce a decrease in dry grip performance, resulting in good dry grip performance. This is believed to be because if the E* remains suitable for wet roads, sufficient grip performance cannot be obtained on dry roads where skidding is less likely to occur; in contrast, an increased E*, which is suitable for dry roads, makes it possible to reduce a decrease in dry grip performance, resulting in good dry grip performance.

Thus, the rubber composition that contains SBR and/or BR, has a complex modulus E* that reversibly changes with water, and satisfies relationships 1) and 2) provides appropriate complex modulus (E*) and rolling resistance depending on the road conditions (wet or dry road), which makes it possible to improve wet performance and dry performance.

Further, the rubber composition satisfies relationship 3) so that the volume of the rubber composition wet with water is 99 to 100% relative to the volume (100%) of the rubber composition before wet with water (the initial dry rubber composition before water-wet). Thus, as the volume change before and after water wetting is small, negative influence on other physical properties such as abrasion resistance, handling stability, and fuel economy can also be reduced.

Therefore, the rubber composition that contains SBR and/or BR, has a complex modulus E* that reversibly changes with water, and satisfies relationships 1) to 3) provides improved overall performance in terms of wet performance (e.g., wet grip performance) and dry performance (e.g., dry grip performance, dry rolling resistance).

Herein, the complex modulus (E*) and the volume of the rubber composition refer to the E* and the volume, respectively, of the vulcanized rubber composition.

Herein, the term "complex modulus E* that reversibly changes with water" means that the complex modulus E* of the (vulcanized) rubber composition reversibly increases or decreases depending on the presence of water. It is sufficient that the complex modulus E* reversibly change when the state of the rubber composition changes, for example, as follows: dry→water-wet→dry. Here, the rubber composition in the former dry state may or may not have the same complex modulus E* as in the latter dry state.

Herein, the term "complex modulus E* before water-wet" refers to the complex modulus E* of the (vulcanized) rubber composition in the dry state before wet with water, and specifically refers to the complex modulus E* of the (vulcanized) rubber composition which has been dried before water wetting as described in EXAMPLES.

Herein, the term "complex modulus E* when water-wet" refers to the complex modulus E* of the (vulcanized) rubber composition in the water-wet state, and specifically refers to the complex modulus E* of the (vulcanized) rubber composition which has been wetted with water as described in EXAMPLES.

Herein, the term "complex modulus E* after water-wet and dehydrated" refers to the complex modulus E* of the (vulcanized) rubber composition obtained by again drying the (vulcanized) rubber composition in the water-wet state, and specifically refers to the complex modulus E* of the (vulcanized) rubber composition obtained by redrying the water-wet (vulcanized) rubber composition as described in EXAMPLES.

Herein, the term "volume before water-wet" refers to the volume of the (vulcanized) rubber composition in the dry state before wet with water, and specifically refers to the volume of the (vulcanized) rubber composition which has been dried before water wetting as described in EXAMPLES.

Herein, the term "volume when water-wet" refers to the volume of the (vulcanized) rubber composition in the water-wet state, and specifically refers to the volume of the (vulcanized) rubber composition which has been wetted with water as described in EXAMPLES.

Herein, the complex modulus E* of the (vulcanized) rubber composition is measured on a test vulcanized rubber sheet using RSA-GII (TA Instruments) at a strain of 0.25%, a frequency of 10 Hz, and a temperature of 23° C.

Herein, the volume of the (vulcanized) rubber composition means the volume calculated from the length, width, and thickness in the case of a rectangular parallelepiped shape, measured in a 23° C. atmosphere.

As shown in relationship 1), the value of "Complex modulus E* when water-wet/Complex modulus E* before water-wet×100" [(the E* of the (vulcanized) rubber composition when water-wet)/(the E* of the (vulcanized) rubber composition before water-wet)×100] is 98 or lower, preferably 96 or lower, more preferably 94 or lower, still more preferably 93 or lower, particularly preferably 92 or lower, most preferably 91 or lower, and may be 90 or lower. When the value is not lower than the lower limit, the road contact area tends to be improved so that a decrease in grip performance can be reduced. The lower limit is not limited, but it is preferably 50 or higher, more preferably 70 or higher, still more preferably 75 or higher. When the value is within the range indicated above, the advantageous effect can be suitably achieved.

As shown in relationship 2), the value of "Complex modulus E* after water-wet and dehydrated/Complex modulus E* before water-wet×100" [(the E* of the (vulcanized) rubber composition after water-wet and dehydrated)/(the E* of the (vulcanized) rubber composition before water-wet)×100] is at least 99 but not higher than 100. When the value is within the range indicated above, the advantageous effect can be suitably achieved.

The complex modulus E* (MPa) before water-wet is preferably 4.0 MPa or higher, more preferably 4.5 MPa or higher, still more preferably 5.0 MPa or higher, particularly preferably 5.4 MPa or higher, most preferably 5.5 MPa or higher, and may be 5.9 MPa or higher, 6.1 MPa or higher, 6.5 MPa or higher, 6.7 MPa or higher, 7.3 MPa or higher, 7.5 MPa or higher, 7.8 MPa or higher, 7.9 MPa or higher, 8.3 MPa or higher, 10.2 MPa or higher, or 11.0 MPa or higher. The upper limit is not limited, but it is preferably 20.0 MPa or lower, more preferably 17.0 MPa or lower, still more preferably 15.2 MPa or lower, particularly preferably 15.1 MPa or lower, and may be 15.0 MPa or lower. When the hardness is within the range indicated above, the advantageous effect can be suitably achieved.

As shown in relationship 3), the value of "Volume when water-wet/Volume before water-wet×100" [(the volume of the (vulcanized) rubber composition when water-wet)/(the volume of the (vulcanized) rubber composition before water-wet)×100] is at least 99 but not higher than 100. A large volume change before and after water wetting will negatively affect other physical properties such as abrasion resistance, handling stability, and fuel economy. Thus, it is important that there be substantially no volume change before and after water wetting in order to maintain tire performance balance.

A rubber composition having a complex modulus E* which changes as shown in relationships 1) and 2) and which reversibly changes with water may be achieved, for example, by incorporating a substance capable of reversibly breaking or re-forming an ionic bond between rubber molecules by adding or drying water. More specifically, for example, when a rubber composition contains a combination of modified BR or modified SBR (e.g., carboxylic acid-modified BR or carboxylic acid-modified SBR) with a compound containing a metal, a metalloid, or nitrogen, it can achieve a complex modulus E* which changes as shown in relationships 1) and 2) and which reversibly changes with water. This is because owing to the combination, the cation derived from the metal, metalloid, or nitrogen and the anion derived from the carboxylic acid can form an ionic bond between the rubber molecules, which may then be cleaved by adding water and re-formed by drying water, with the result that the E* decreases when water-wet and increases when dry (before water-wet, after redried).

The E* when dry (before water-wet, after redried) can be controlled by the types and amounts of the chemicals (in particular, rubber components, fillers, softeners such as oils) incorporated in a rubber composition. For example, a lower softener content tends to increase the E* when dry, and a higher filler content tends to increase the E* when dry. Moreover, the E* when dry can be controlled by, for example, the degree of carboxylic acid modification (carboxylic acid group content) of the modified BR or modified SBR (e.g., carboxylic acid-modified BR or carboxylic acid-modified SBR). A higher carboxylic acid group content tends to increase the E* when dry.

The E* when water-wet can be reduced compared to the E* when dry, for example, by cross-linking a rubber composition by ionic bonding so that the rubber molecules of the rubber components are partially or fully cross-linked by ionic bonding. Thus, the E* when dry or when water-wet can be controlled. More specifically, when a rubber composition contains a combination of modified BR or modified SBR (e.g., carboxylic acid-modified BR or carboxylic acid-modified SBR) with a compound containing a metal, a metalloid, or nitrogen, it can be cross-linked by ionic bonding so that the E* when water-wet can be reduced compared to the E* when dry. Moreover, the E* when water-wet can be controlled by the types and amounts of the chemicals (in particular, rubber components, fillers, softeners such as oils) incorporated in a rubber composition. For example, a higher filler content tends to increase the E* when water-wet, and a lower softener content tends to increase the E* when water-wet.

More specifically, when the E* when dry (before water-wet, after redried) is adjusted within a desired range, and further modified BR or modified SBR (e.g., carboxylic acid-modified BR or carboxylic acid-modified SBR) is combined with a compound containing a metal, a metalloid, or nitrogen, the rubber composition can achieve an E* which changes as shown in relationships 1) and 2) and which reversibly changes with water, and can also achieve an E* before water-wet as described above.

A rubber composition having a volume which slightly changes as shown in relationship 3) may also be achieved, for example, by incorporating a substance capable of reversibly breaking or re-forming an ionic bond between rubber molecules by adding or drying water. More specifically, when a rubber composition contains a combination of modified BR or modified SBR (e.g., carboxylic acid-modified BR or carboxylic acid-modified SBR) with a compound containing a metal element, a metalloid element, or a nitrogen element, it can achieve a volume which slightly changes as shown in relationship 3). This is because the cation derived from the metal, metalloid, or nitrogen and the modified BR or modified SBR (e.g., carboxylic acid-modified BR or carboxylic acid-modified SBR) can form an ionic bond between the rubber molecules, which may then be cleaved by adding water but to an extremely small extent so that the volume is not affected by absorption of water into the polymers, followed by being re-formed by drying water but to an extremely small extent so that the volume is not affected by dehydration of the polymers, with the result that a change in the volume of the rubber composition can be reduced. Moreover, even a rubber composition not containing a substance as described above, for example, a rubber composition containing general SBR or BR (e.g., unmodified SBR or BR), fillers, or the like can achieve a volume which slightly changes as shown in relationship 3).

Usable chemicals are described below.

The rubber composition contains SBR and/or BR as rubber components. Moreover, in the rubber composition, the rubber molecules of the rubber components are preferably partially or fully cross-linked by ionic bonding. The presence of ionic bonds in the crosslinks of the polymer components (rubber components) allows the $E^*$ to decrease only when wet with water due to the reversibility of the noncovalent ionic bonds. Moreover, since ionic bonds have the highest bonding strength among noncovalent bonds, they can maintain sufficient bonding strength when dry.

In the rubber composition, the proportion of crosslinks via ionic bonding based on 100% of the total crosslinks is preferably 0.1% or higher, more preferably 0.5% or higher, still more preferably 1% or higher. When the proportion is not lower than the lower limit, good wet performance and good dry performance tend to be obtained. The upper limit is not limited and may be 100%, but it is preferably 10% or lower, more preferably 5% or lower.

The proportion of crosslinks via ionic bonding can be measured as described later in EXAMPLES.

The ionic bond between the rubber molecules is not limited, and examples include ionic bonds with a cation derived from at least one selected from the group consisting of metal elements, metalloid elements, and a nitrogen element, and an anion derived from at least one selected from the group consisting of carboxylic acid-modified SBR and carboxylic acid-modified BR. Specifically, it may include any combination of at least one selected from the group consisting of metal elements, metalloid elements, and a nitrogen element with at least one selected from the group consisting of carboxylic acid-modified SBR and carboxylic acid-modified BR, such as a combination of a metal element as cation and carboxylic acid-modified SBR as anion, a combination of a metal element as cation and carboxylic acid-modified BR as anion, a combination of a metalloid element as cation and carboxylic acid-modified SBR as anion, a combination of a metalloid element as cation and carboxylic acid-modified BR as anion, a combination of a nitrogen element as cation and carboxylic acid-modified SBR as anion, and a combination of an nitrogen element as cation and carboxylic acid-modified BR as anion.

Examples of the metal elements as cation include alkali metals (e.g., lithium, sodium, potassium) and alkaline earth metals (e.g., magnesium, calcium, strontium). Examples of the metalloid elements as cation include silicon, boron, and germanium.

The metal elements, metalloid elements, or nitrogen element as the cation of the ionic bond may be suitably supplied by compounds containing at least one selected from the group consisting of metal elements, metalloid elements, and a nitrogen element. In this case, the metal element, metalloid element, or nitrogen element in the compounds constitutes the cation of the ionic bond. Compounds containing a nitrogen element, among others, are preferred, and examples include nitrogen element-containing compounds (e.g., ammonia, amines) capable of forming a cation such as a quaternary ammonium salt.

Specific examples of the nitrogen element-containing compounds (compounds containing a nitrogen element) include 1,2-dimethylimidazole, N-butylimidazole, N-(trimethylsilyl)imidazole, N-decyl-2-methylimidazole, N-hydroxyethylimidazole, N-(3-trimethoxysilylpropyl)imidazole, N-vinylimidazole, and 1-butylbenzimidazole; trimethylamine, triethylamine, triisopropylamine, tri-n-butylamine, trimethylphosphine, triethylphosphine, triisopropylphosphine, tri-n-butylphosphine, and triphenylphosphine. These may be used alone or in combinations of two or more. Imidazole compounds such as N-butylimidazole are preferred among these.

The amount of the "compounds containing at least one selected from the group consisting of metal elements, metalloid elements, and a nitrogen element" per 100 parts by mass of the rubber components is preferably 0.5 parts by mass or more, more preferably 1 part by mass or more, still more preferably 2 parts by mass or more, particularly preferably 3 parts by mass or more, but is preferably 30 parts by mass or less, more preferably 10 parts by mass or less, still more preferably 7 parts by mass or less. When the amount is within the range indicated above, the advantageous effect tends to be well achieved. The amount of the nitrogen element-containing compounds is desirably within the range as indicated above.

Examples of the carboxylic acid-modified SBR and carboxylic acid-modified BR as the anion of the ionic bond include SBR containing a carboxylic acid (carboxyl) group and BR containing a carboxylic acid (carboxyl) group. In this case, the carboxylic acid group of the carboxylic acid-modified SBR or carboxylic acid-modified BR constitutes the anion of the ionic bond.

The carboxylic acid-modified SBR and carboxylic acid-modified BR as the SBR and BR, respectively, may be any SBR or BR containing a carboxylic acid (carboxyl) group. Examples include chain end-modified SBR or BR obtained by modifying at least one chain end of SBR or BR with a compound (modifier) containing a carboxylic acid group (i.e., chain end-modified SBR or BR terminated with a carboxylic acid group); backbone-modified SBR or BR containing a carboxylic acid group in the backbone; and backbone- and chain end-modified SBR or BR containing a carboxylic acid group in both the backbone and chain end (e.g., backbone- and chain end-modified SBR or BR in which the backbone has a carboxylic acid group and at least one chain end is modified with a carboxylic acid group). These may be used alone or in combinations of two or more.

The amount of the "rubber components including at least one selected from the group consisting of carboxylic acid-modified SBR and carboxylic acid-modified BR" based on 100% by mass of the rubber components is preferably 50% by mass or more, more preferably 70% by mass or more, still more preferably 80% by mass or more. When the amount is not less than the lower limit, good wet performance and good dry performance tend to be obtained. The upper limit is not limited and may be 100% by mass. The amount of the carboxylic acid-modified SBR or carboxylic acid-modified BR is desirably within the range as indicated above.

Examples of other rubber components include diene rubbers such as isoprene-based rubbers, styrene-isoprene-butadiene rubbers (SIBR), acrylonitrile-butadiene rubbers (NBR), and chloroprene rubbers (CR). The rubber components may be used alone or in combinations of two or more.

To well achieve the advantageous effect, the rubber composition preferably contains at least one selected from the group consisting of carbon black and silica. To more suitably provide good wet performance and good dry performance, the rubber composition preferably contains silica, among others. Suitable examples of such rubber compositions include those containing one or more rubber components that satisfy any of the combinations listed above regarding the cation and anion of the ionic bond and at least one selected from the group consisting of carbon black and silica, and those containing the one or more rubber components and at least silica.

The amount (total amount) of the "at least one selected from the group consisting of carbon black and silica" per 100 parts by mass of the rubber components is preferably 1.0 part by mass or more, more preferably 10 parts by mass or more, still more preferably 15 parts by mass or more, particularly preferably 30 parts by mass or more, but is preferably 100 parts by mass or less, more preferably 70 parts by mass or less, still more preferably 60 parts by mass or less, and may be 50 parts by mass or less, or 35 parts by mass or less. When the amount is within the range indicated above, the advantageous effect tends to be well achieved.

Examples of the silica include dry silica (silicic anhydride) and wet silica (hydrous silicic acid). Wet silica is preferred because it contains a large number of silanol groups. These may be used alone or in combinations of two or more.

The nitrogen adsorption specific surface area ($N_2SA$) of the silica is preferably 60 $m^2/g$ or more, more preferably 80 $m^2/g$ or more, still more preferably 160 $m^2/g$ or more, particularly preferably 170 $m^2/g$ or more. The $N_2SA$ is also preferably 600 $m^2/g$ or less, more preferably 300 $m^2/g$ or less, still more preferably 250 $m^2/g$ or less, particularly preferably 200 $m^2/g$ or less. When the $N_2SA$ is within the range indicated above, the advantageous effect tends to be suitably achieved.

The $N_2SA$ of the silica is determined by a BET method in accordance with ASTM D3037-81.

The silica may be commercially available from Degussa, Rhodia, Tosoh Silica Corporation, Solvay Japan, Tokuyama Corporation, etc.

The amount of the silica per 100 parts by mass of the rubber component is preferably 1.0 part by mass or more, more preferably 10 parts by mass or more, still more preferably 15 parts by mass or more, particularly preferably 30 parts by mass or more, but is preferably 100 parts by mass or less, more preferably 70 parts by mass or less, still more preferably 50 parts by mass or less. When the amount is within the range indicated above, the advantageous effect tends to be well achieved.

The rubber composition containing silica preferably further contains one or more silane coupling agents.

Any silane coupling agent may be used, and examples include sulfide silane coupling agents such as bis(3-triethoxysilylpropyl) tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)

disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 2-triethoxysilylethyl-N,N-dimethylthiocarbamoyltetrasulfide, and 3-triethoxysilylpropyl methacrylate monosulfide; mercapto silane coupling agents such as 3-mercaptopropyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Commercial products available from Degussa, Momentive, Shin-Etsu Silicone, Tokyo Chemical Industry Co., Ltd., AZmax. Co., Dow Corning Toray Co., Ltd., etc. may be used. These may be used alone or in combinations of two or more. Sulfide and mercapto silane coupling agents are preferred among these, with disulfide silane coupling agents having disulfide bonds (e.g., bis(3-triethoxysilylpropyl)disulfide) being more preferred, because then the advantageous effect tends to be better achieved.

The amount of the silane coupling agents per 100 parts by mass of the silica is preferably 3 parts by mass or more, more preferably 5 parts by mass or more, but is preferably 20 parts by mass or less, more preferably 15 parts by mass or less. When the amount is within the range indicated above, the advantageous effect tends to be well achieved.

Examples of usable carbon black include those commonly used in the tire industry, such as GPF, HAF, ISAF, and SAF. These may be used alone or in combinations of two or more.

The BET specific surface area of the carbon black is preferably 50 $m^2/g$ or more, more preferably 100 $m^2/g$ or more, still more preferably 110 $m^2/g$ or more, particularly preferably 120 $m^2/g$ or more. When the BET specific surface area is not less than the lower limit, sufficient wet performance and abrasion resistance tend to be obtained. The upper limit is preferably 200 $m^2/g$ or less, more preferably 180 $m^2/g$ or less. When the BET specific surface area is not more than the upper limit, good dispersion and excellent abrasion resistance tend to be obtained.

The BET specific surface area of the carbon black is measured by a BET method in accordance with ASTM D6556.

The dibutyl phthalate oil absorption (DBP) of the carbon black is preferably 50 ml/100 g or more, more preferably 100 ml/100 g or more, still more preferably 110 ml/100 g or more. When the DBP is not less than the lower limit, sufficient wet performance and abrasion resistance tend to be obtained. The DBP of the carbon black is also preferably 220 ml/100 g or less, more preferably 180 ml/100 g or less. When the DBP is not more than the upper limit, good dispersion and excellent abrasion resistance tend to be obtained.

The DBP of the carbon black is measured in accordance with JIS K6217-4:2001.

The carbon black may be commercially available from Asahi Carbon Co., Ltd., Cabot Japan K.K., Tokai Carbon Co., Ltd., Mitsubishi Chemical Corporation, Lion Corporation, NSCC Carbon Co., Ltd., Columbia Carbon, etc.

The amount of the carbon black per 100 parts by mass of the rubber components is preferably 1.0 part by mass or more, more preferably 3.0 parts by mass or more, still more preferably 5.0 parts by mass or more, but is preferably 50 parts by mass or less, more preferably 30 parts by mass or less, still more preferably 15 parts by mass or less. When the amount is within the range indicated above, the advantageous effect tends to be well achieved.

The proportion of the silica based on 100% by mass of the total amount of the carbon black and the silica in the rubber composition is preferably 10% by mass or more, more preferably 20% by mass or more, still more preferably 30% by mass or more, particularly preferably 60% by mass or more, most preferably 80% by mass or more. The upper limit is not limited and may be 100% by mass. When the proportion is within the range indicated above, the advantageous effect tends to be suitably achieved.

The rubber composition may contain one or more plasticizers. The term "plasticizer" refers to a material which imparts plasticity to a rubber component, and examples include liquid plasticizers (plasticizers that are liquid at room temperature (25° C.)) and resins (resins that are solid at room temperature (25° C.)

The amount of the plasticizers (the total amount of the plasticizers) per 100 parts by mass of the rubber components is preferably 50 parts by mass or less, more preferably 30 parts by mass or less, still more preferably 20 parts by mass or less. The lower limit is not limited and may be 0 parts by mass, but it is preferably 1 part by mass or more, more preferably 5 parts by mass or more, still more preferably 10 parts by mass or more, particularly preferably 15 parts by mass or more. When the amount is within the range indicated above, the advantageous effect tends to be suitably achieved.

Any liquid plasticizer (plasticizers that are liquid at room temperature (25° C.)) may be used. Examples include oils and liquid polymers (e.g., liquid resins, liquid diene polymers, liquid farnesene polymers). These may be used alone or in combinations of two or more.

To well achieve the advantageous effect, the amount of the liquid plasticizers per 100 parts by mass of the rubber components is preferably 30 parts by mass or less, more preferably 20 parts by mass or less, still more preferably 10 parts by mass or less. No (0 parts by mass) liquid plasticizer may be present. The amount of the oils described later is desirably within the range as indicated above (the amount of the oils includes the amount of the oils contained in the extender oils, if used).

Examples of the oils include process oils, plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, *camellia* oil, jojoba oil, macadamia nut oil, and tung oil. Process oils (e.g., paraffinic process oils, aromatic process oils, naphthenic process oils) and plant oils are preferred among these.

Examples of the liquid resins include terpene resins (including terpene phenol resins and aromatic modified terpene resins), rosin resins, styrene resins, C5 resins, C9 resins, C5/C9 resins, dicyclopentadiene (DCPD) resins, coumarone-indene resins (including resins based on coumarone or indene alone), phenol resins, olefin resins, polyurethane resins, and acrylic resins. Hydrogenated products of the foregoing resins may also be used.

Examples of the liquid diene polymers include liquid styrene-butadiene copolymers (liquid SBR), liquid polybutadiene polymers (liquid BR), liquid polyisoprene polymers (liquid IR), liquid styrene-isoprene copolymers (liquid SIR), liquid styrene-butadiene-styrene block copolymers (liquid SBS block polymers), liquid styrene-isoprene-styrene block copolymers (liquid SIS block polymers), liquid farnesene polymers, and liquid farnesene-butadiene copolymers, all of which are liquid at 25° C. The chain end or backbone of the foregoing polymers may be modified with a polar group. Hydrogenated products of the foregoing polymers may also be used.

Examples of usable resins (resins that are solid at room temperature (25° C.)) include aromatic vinyl polymers, coumarone-indene resins, coumarone resins, indene resins, phenol resins, rosin resins, petroleum resins, terpene resins, and acrylic resins, all of which are solid at room temperature (25° C.). The resins may also be hydrogenated. These may be used alone or in combinations of two or more. Aromatic vinyl polymers, petroleum resins, and terpene resins are preferred among these.

The amount of the resins per 100 parts by mass of the rubber components is preferably 50 parts by mass or less, more preferably 30 parts by mass or less, still more preferably 20 parts by mass or less. The lower limit is not limited and may be 0 parts by mass, but it is preferably 1 part by mass or more, more preferably 5 parts by mass or more, still more preferably 10 parts by mass or more, particularly preferably 15 parts by mass or more. When the amount is within the range indicated above, the advantageous effect tends to be suitably achieved.

The softening point of the resins is preferably 60° C. or higher, more preferably 70° C. or higher, still more preferably 80° C. or higher. The upper limit is preferably 160° C. or lower, more preferably 130° C. or lower, still more preferably 115° C. or lower. When the softening point is within the range indicated above, the advantageous effect tends to be suitably achieved.

The softening point of the resins is determined in accordance with JIS K 6220-1:2001 using a ring and ball softening point measuring apparatus and defined as the temperature at which the ball drops down.

The term "aromatic vinyl polymer" refers to a polymer containing an aromatic vinyl monomer as a structural unit, for example, a resin produced by polymerizing α-methylstyrene and/or styrene. Specific examples include styrene homopolymers (styrene resins), α-methylstyrene homopolymers (α-methylstyrene resins), copolymers of α-methylstyrene and styrene, and copolymers of styrene and other monomers.

The term "coumarone-indene resin" refers to a resin that contains coumarone and indene as main monomer components forming the skeleton (backbone) of the resin. Examples of monomer components which may be contained in the skeleton in addition to coumarone and indene include styrene, α-methylstyrene, methylindene, and vinyltoluene.

The term "coumarone resin" refers to a resin that contains coumarone as a main monomer component forming the skeleton (backbone) of the resin.

The term "indene resin" refers to a resin that contains indene as a main monomer component forming the skeleton (backbone) of the resin.

Examples of usable phenol resins include known polymers produced by reactions of phenol with aldehydes such as formaldehyde, acetaldehyde, or furfural in the presence of acid or alkali catalysts. Phenol resins produced by reactions using acid catalysts (e.g., novolac-type phenol resins) are preferred among these.

Examples of the rosin resins include rosin-based resins such as typically natural rosins, polymerized rosins, modified rosins, esterified compounds thereof, and hydrogenated products thereof.

Examples of the petroleum resins include C5 resins, C9 resins, C5/C9 resins, and dicyclopentadiene (DCPD) resins, and hydrogenated products of the foregoing resins. DCPD resins or hydrogenated DCPD resins are preferred among these.

The term "terpene resin" refers to a polymer containing terpene as a structural unit. Examples include polyterpene resins produced by polymerization of terpene compounds, and aromatic modified terpene resins produced by polymerization of terpene compounds and aromatic compounds. Examples of the aromatic modified terpene resins include terpene phenol resins made from terpene compounds and phenolic compounds, terpene styrene resins made from terpene compounds and styrene compounds, and terpene phenol styrene resins made from terpene compounds, phenolic compounds, and styrene compounds. Examples of the terpene compounds include α-pinene and β-pinene. Examples of the phenolic compounds include phenol and bisphenol A. Examples of the aromatic compounds include styrene compounds (e.g., styrene, α-methylstyrene).

The term "acrylic resin" refers to a polymer containing an acrylic monomer as a structural unit. Examples include styrene acrylic resins such as styrene acrylic resins containing carboxyl groups and producible by copolymerization of aromatic vinyl monomer components and acrylic monomer components. Solvent-free, carboxyl group-containing styrene acrylic resins are suitable among these.

The plasticizers may be commercially available from Idemitsu Kosan Co., Ltd., Sankyo Yuka Kogyo K.K., Japan Energy Corporation, Olisoy, H&R, Hokoku Corporation, Showa Shell Sekiyu K.K., Fuji Kosan Co., Ltd., The Nisshin OilliO Group, Ltd., Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., ENEOS Corporation, Arakawa Chemical Industries, Ltd., Taoka Chemical Co., Ltd., etc.

The rubber composition may contain one or more waxes.

Any wax may be used. Examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Petroleum waxes are preferred among these, with paraffin waxes being more preferred.

The waxes may be commercially available from Ouchi Shinko Chemical Industrial Co., Ltd., Nippon Seiro Co., Ltd., Seiko Chemical Co., Ltd., etc.

The amount of the waxes, if present, per 100 parts by mass of the rubber components is preferably 0.3 parts by mass or more, more preferably 0.5 parts by mass or more, but is preferably 20 parts by mass or less, more preferably 10 parts by mass or less. The rubber composition may contain no wax.

The rubber composition may contain one or more antioxidants.

Examples of the antioxidants include naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis [methylene-3-(3',5'-di-t-butyl-4'-hydroxyphenyl)propionate]methane. These may be used alone or in combinations of two or more. Preferred among these are p-phenylenediamine or quinoline antioxidants.

The antioxidants may be commercially available from Seiko Chemical Co., Ltd., Sumitomo Chemical Co., Ltd., Ouchi Shinko Chemical Industrial Co., Ltd., Flexsys, etc.

The amount of the antioxidants, if present, per 100 parts by mass of the rubber components is preferably 0.5 parts by mass or more, more preferably 1 part by mass or more, but is preferably 10 parts by mass or less, more preferably 5 parts by mass or less. The rubber composition may contain no antioxidant.

The rubber composition may contain stearic acid.

The stearic acid may be conventional ones, e.g., available from NOF Corporation, Kao Corporation, Wako Pure Chemical Corporation, or Chiba Fatty Acid Co., Ltd.

The amount of the stearic acid, if present, per 100 parts by mass of the rubber components is preferably 0.5 parts by mass or more, more preferably 1 part by mass or more, but is preferably 10 parts by mass or less, more preferably 5 parts by mass or less. The rubber composition may contain no stearic acid.

The rubber composition may contain zinc oxide.

The zinc oxide may be conventional ones, e.g., available from Mitsui Mining & Smelting Co., Ltd., Toho Zinc Co., Ltd., HakusuiTech Co., Ltd., Seido Chemical Industry Co., Ltd., or Sakai Chemical Industry Co., Ltd.

The amount of the zinc oxide, if present, per 100 parts by mass of the rubber components is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved. The rubber composition may contain no zinc oxide.

The rubber composition may contain sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be commercially available from Tsurumi Chemical Industry Co., Ltd., Karuizawa sulfur Co., Ltd., Shikoku Chemicals Corporation, Flexsys, Nippon Kanryu Industry Co., Ltd., Hosoi Chemical Industry Co., Ltd., etc.

The amount of the sulfur, if present, per 100 parts by mass of the rubber components is preferably 0.1 parts by mass or more, more preferably 0.5 parts by mass or more, but is preferably 10 parts by mass or less, more preferably 5 parts by mass or less, still more preferably 3 parts by mass or less. The rubber composition may contain no sulfur.

The rubber composition may contain one or more vulcanization accelerators.

Examples of the vulcanization accelerators include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-tert-butyl-2-benzothiazolylsulfenamide, N-oxyethylene-2-benzothiazole sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. To more suitably achieve the advantageous effect, sulfenamide and/or guanidine vulcanization accelerators are preferred among these.

The vulcanization accelerators may be commercially available from Kawaguchi Chemical Industry Co., Ltd., Ouchi Shinko Chemical Industrial Co., Ltd., etc.

The amount of the vulcanization accelerators, if present, per 100 parts by mass of the rubber components is preferably 1 part by mass or more, more preferably 2 parts by mass or more, but is preferably 10 parts by mass or less, more preferably 7 parts by mass or less. The rubber composition may contain no vulcanization accelerator.

To suitably achieve the advantageous effect, the rubber composition preferably satisfies the following relationship with respect to the silica content (parts by mass) per 100 parts by mass of the rubber components and the plasticizer content (parts by mass) per 100 parts by mass of the rubber components:

Plasticizer content/Silica content<1.0.

The ratio of "Plasticizer content/Silica content" is preferably 0.9 or lower, more preferably 0.8 or lower, still more preferably 0.7 or lower, particularly preferably 0.6 or lower. The lower limit is not limited, but it is preferably 0.1 or higher, more preferably 0.2 or higher, still more preferably 0.3 or higher, particularly preferably 0.4 or higher. When the lower limit is within the range indicated above, the advantageous effect tends to be suitably achieved.

To suitably achieve the advantageous effect, the rubber composition preferably satisfies the following relationship with respect to the silica content (parts by mass) per 100 parts by mass of the rubber components and the resin (resin that is solid at room temperature (25° C.)) content (parts by mass) per 100 parts by mass of the rubber components:

Resin content/Silica content<1.0.

The ratio of "Resin content/Silica content" is preferably 0.9 or lower, more preferably 0.8 or lower, still more preferably 0.7 or lower, particularly preferably 0.6 or lower. The lower limit is not limited, but it is preferably 0.1 or higher, more preferably 0.2 or higher, still more preferably 0.3 or higher, particularly preferably 0.4 or higher. When the lower limit is within the range indicated above, the advantageous effect tends to be suitably achieved.

In addition to the above-mentioned components, the rubber composition may further contain additives commonly used in the tire industry, including organic peroxides and fillers such as calcium carbonate, talc, alumina, clay, aluminum hydroxide, and mica. The amount of these additives per 100 parts by mass of the rubber components is preferably 0.1 to 200 parts by mass. The rubber composition may not contain these additives.

The rubber composition may be prepared, for example, by kneading the components in a rubber kneading machine such as an open roll mill or Banbury mixer, and vulcanizing the kneaded mixture.

The kneading conditions are as follows: in a base kneading step of kneading additives other than vulcanizing agents and vulcanization accelerators, the kneading temperature is usually 100 to 180° C., preferably 120 to 170° C., while in a final kneading step of kneading vulcanizing agents and vulcanization accelerators, the kneading temperature is usually 120° C. or lower, preferably 80 to 110° C. Moreover, the composition obtained by kneading vulcanizing agents and vulcanization accelerators is usually vulcanized by press vulcanization, for example. The vulcanization temperature is usually 140 to 190° C., preferably 150 to 185° C. The vulcanization time is usually 5 to 15 minutes.

The rubber composition may be used in tire components (i.e., as a rubber composition for tires) such as treads (cap treads), sidewalls, base treads, undertreads, shoulders, clinches, bead apexes, breaker cushion rubbers, rubbers for carcass cord topping, insulations, chafers, and innerliners, and side reinforcement layers of run-flat tires. To reduce a change in grip performance caused by a change in road conditions from dry to wet road, the rubber composition may be suitably used in treads or shoulders, particularly cap treads, of tires, among others. To improve wet handling stability, the rubber composition may also be suitably used in sidewalls.

The tire (e.g., pneumatic tire) of the present disclosure can be produced from the above-described rubber composition by usual methods. Specifically, the unvulcanized rubber composition containing additives as needed may be extruded into the shape of a tire component (e.g., tread or sidewall) and then formed and assembled with other tire components on a tire building machine in a usual manner to build an unvulcanized tire, which may then be heated and pressurized in a vulcanizer to produce a tire.

It is sufficient that the tire component (e.g., tread or sidewall) of the tire at least partially include the rubber composition. The whole tire component may include the rubber composition.

The tire is suitable for use as, for example, a tire for passenger vehicles, large passenger vehicles, large SUVs, trucks and buses, or two-wheeled vehicles, or as a racing tire, a studless winter tire (winter tire), an all-season tire, a run-flat tire, an aircraft tire, or a mining tire.

EXAMPLES

The present disclosure is specifically described with reference to, but not limited to, examples.

The chemicals used in the examples and comparative examples are listed below.

Carboxylic acid-modified BR: Nanoprene B M750H VP available from Lanxess

Carboxylic acid-modified SBR: Nipol LX426 (styrene-butadiene latex, rubber solids content 50%) available from Zeon Corporation Here, the carboxylic acid-modified SBR used is a coagulated rubber prepared by subjecting Nipol LX426 to the following steps:

1) 12 kg of EKINEN (a mixed solvent with alcohol as a main agent) is weighed into a 25 L bucket and mechanically stirred;

2) 6.5 kg of an emulsion (Nipol LX426) is weighed and poured into 1);

3) 1.5 kg of a 0.5% sulfuric acid aqueous solution is weighed and poured into 2);

4) the mixture is filtered through a sieve (wet polymer, about 6.5 kg);

5) the product is dried by air blowing in a walk-in draft chamber; and 6) drying is performed to a loss on drying of 0.5% in a vacuum oven (dry polymer, about 3.1 kg).

BR: BR150B available from Ube Industries, Ltd.

SBR: Nipol 1502 (E-SBR) available from Zeon Corporation 1,2-Dimethylimidazole: CUREZOL 1.2DMZ available from Shikoku Chemicals Corporation 1-Butylimidazole: a commercial product Silica 1: Ultrasil VN3 ($N_2$SA 175 $m^2$/g) available from Evonik Degussa Silica 2: 9000GR ($N_2$SA 235 $m^2$/g) available from Evonik Degussa Carbon black: Seast 9H (DBP oil absorption 115 mL/g, BET specific surface area 110 $m^2$/g) available from Tokai Carbon Co., Ltd.

Resin: SYLVARES SA85 (copolymer of α-methylstyrene and styrene, Tg 43° C., softening point 85° C.) available from Arizona Chemical Stearic acid: stearic acid "TSUBAKI" available from NOF Corporation Zinc oxide: zinc oxide #2 available from Mitsui Mining & Smelting Co., Ltd.

Vulcanization accelerator 1: NOCCELER NS (N-tert-butyl-2-benzothiazolylsulfenamide) available from Ouchi Shinko Chemical Industrial Co., Ltd.

Vulcanization accelerator 2: NOCCELER D (1,3-diphenylguanidine) available from Ouchi Shinko Chemical Industrial Co., Ltd.

Sulfur: powdered sulfur available from Tsurumi Chemical Industry Co., Ltd.

Examples and Comparative Examples

According to each formulation shown in the tables, the chemicals other than the sulfur and vulcanization accelerators were kneaded using a 1.7 L Banbury mixer (Kobe Steel, Ltd.) at 160° C. for four minutes to give a kneaded mixture. Then, the kneaded mixture was kneaded with the sulfur and vulcanization accelerators in an open roll mill at 80° C. for four minutes to give an unvulcanized rubber composition.

The unvulcanized rubber composition was press-vulcanized at 170° C. for 12 minutes to give a vulcanized rubber composition.

Separately, the unvulcanized rubber composition prepared as above was formed into a tread shape and assembled with other tire components on a tire-building machine to build an unvulcanized tire. The unvulcanized tire was vulcanized at 170° C. for 12 minutes to prepare a test tire (size: 195/65R15).

It should be noted that Comparative Examples 1-1 and 3-1 are used as standards of comparison in Tables 1 and 3, respectively. In Table 2, Comparative Examples 2-2, 2-4, and 2-1 are used as standards of comparison for wet grip performance, dry grip performance, and fuel economy, respectively.

The vulcanized rubber compositions and test tires prepared as above were evaluated as described below. The tables show the results.

<Measurement of Complex Modulus E*>

The complex modulus E* of rubber pieces (vulcanized rubber compositions) was measured using RSA-GII available from TA Instruments (The E* values were averages of five measurements.

(Measurement Conditions)

Measurement mode: elongation

Frequency: 10 Hz

Strain: 0.25%

Temperature: 23° C.

Sample size: L 10 mm×W 3 mm×T 0.5 mm (L: distance between chucks)

(Complex Modulus E* Before Water-Wet)

The vulcanized rubber compositions with the above-mentioned sample size were dried to a constant weight at room temperature and normal pressure. The complex modulus E* of the resulting vulcanized rubber compositions (rubber pieces) before water-wet was measured as described above and used as the E* before water-wet.

(Complex Modulus E* when Water-Wet)

The vulcanized rubber compositions with the above-mentioned sample size were immersed in 100 mL of water at 23° C. for two hours to obtain vulcanized rubber compositions when water-wet. The complex modulus E* of the vulcanized rubber compositions (rubber pieces) when water-wet was measured as described above and used as the E* when water-wet.

(Complex Modulus E* after Water-Wet and Dehydrated)

The vulcanized rubber compositions when water-wet were dried to a constant weight at room temperature and normal pressure to obtain vulcanized rubber compositions after water-wet and dehydrated. After the temperature of the vulcanized rubber compositions after water-wet and dehydrated was returned to 23° C., the complex modulus E* of the vulcanized rubber compositions (rubber pieces) after water-wet and dehydrated was measured as described above and used as the E* after water-wet and dehydrated.

<Measurement of Volume Change>

The volume of each rubber piece having a rectangular parallelepiped shape (30.0 mm in length×30.0 mm in width× 0.50 mm in thickness) was measured using a stereomicroscope Leica M205C (at 23° C.)

The volume before water-wet was measured as follows: the rectangular parallelepiped rubber piece was dried to a constant weight at room temperature and normal pressure, and then the temperature of the resulting vulcanized rubber composition was adjusted to 23° C. Then, the volume of the resulting vulcanized rubber composition before water-wet was measured as described above (volume before water-wet).

The rectangular parallelepiped rubber piece was immersed in 100 mL of water at 23° C. for two hours to obtain a vulcanized rubber composition when water-wet, and then the vulcanized rubber composition was adjusted at 23° C. Then, the volume of the resulting vulcanized rubber composition when water-wet was measured as described above (volume when water-wet).

<Wet Grip Performance>

The test tires were mounted on every wheel of a vehicle (front-engine, front-wheel-drive car of 2,000 cc displacement made in Japan), and the braking distance of the vehicle with an initial speed of 100 km/h on a wet asphalt road was determined. The braking distance of each formulation example is expressed as an index relative to the standard comparative example set equal to 100. A higher index indicates better wet grip performance.

<Dry Grip Performance>

The test tires were mounted on every wheel of a vehicle (front-engine, front-wheel-drive car of 2,000 cc displacement made in Japan), and the braking distance of the vehicle with an initial speed of 100 km/h on a dry asphalt road was determined. The braking distance of each formulation example is expressed as an index relative to the standard comparative example set equal to 100. A higher index indicates better dry grip performance. It should be noted that if the index is 97 or higher, there would be no practical problem.

(Fuel Economy (Rolling Resistance))

The rolling resistance of the test tires running on a rim of 15×6JJ at an internal pressure of 230 kPa, a load of 3.43 kN, and a speed of 80 km/h was measured using a rolling resistance tester and expressed as an index relative to the standard comparative example set equal to 100. A higher index indicates better fuel economy on dry roads. It should be noted that if the index is 85 or higher, there would be no practical problem.

TABLE 1

| | | Example | | Comparative Example |
|---|---|---|---|---|
| | | 1-1 | 1-2 | 1-1 |
| Amount (parts by mass) | Carboxylic acid-modified BR | 100 | 100 | — |
| | Carboxylic acid-modified SBR | — | — | — |
| | BR | — | — | 100 |
| | SBR | — | — | — |
| | 1,2-Dimethylimidazole | 3 | — | — |
| | 1-Butylimidazole | — | 3 | — |
| | Silica 1 | 30 | 30 | 30 |
| | Stearic acid | — | — | 2 |
| | Zinc oxide | — | — | 2 |
| | Vulcanization accelerator 1 | — | — | 2 |
| | Vulcanization accelerator 2 | — | — | 2 |
| | Sulfur | — | — | 1.5 |
| Evaluation result | Complex modulus E* when water-wet/Complex modulus E* before water-wet × 100 | 92 | 94 | 100 |
| | Complex modulus E* after water-wet and dehydrated/Complex modulus E* before water-wet × 100 | 100 | 100 | 100 |
| | Complex modulus E* before water-wet (MPa) | 5.5 | 5.9 | 5.4 |
| | Volume when water-wet/Volume before water-wet × 100 | 99 | 99 | 100 |
| | Wet grip performance | 107 | 105 | 100 |
| | Dry grip performance | 100 | 100 | 100 |
| | Fuel economy (rolling resistance) | 100 | 100 | 100 |

TABLE 2

| | | Example | | | | | | | | Comparative Example | | | |
|---|---|---|---|---|---|---|---|---|---|---|---|---|---|
| | | 2-1 | 2-2 | 2-3 | 2-4 | 2-5 | 2-6 | 2-7 | 2-8 | 2-1 | 2-2 | 2-3 | 2-4 |
| Amount (parts by mass) | Carboxylic acid-modified BR | 100 | 100 | 100 | 100 | 100 | 100 | 100 | 100 | — | — | — | — |
| | Carboxylic acid-modified SBR | — | — | — | — | — | — | — | — | 100 | 100 | 100 | — |
| | BR | — | — | — | — | — | — | — | — | — | — | — | 100 |
| | SBR | — | — | — | — | — | — | — | — | — | — | — | — |
| | 1,2-Dimethylimidazole | 3 | 3 | 3 | 3 | 3 | 3 | 3 | — | — | — | — | — |
| | 1-Butylimidazole | — | — | — | — | — | — | — | 3 | — | — | — | — |
| | Silica 1 | 30 | 30 | 60 | 60 | — | — | 30 | 30 | 30 | 60 | — | — |
| | Silica 2 | — | — | — | — | 30 | 30 | — | — | — | — | 30 | 30 |
| | Resin | — | — | — | — | — | — | 20 | 20 | — | — | — | 20 |
| | Stearic acid | — | — | — | — | — | — | — | — | 2 | 2 | 2 | 2 |
| | Zinc oxide | — | — | — | — | — | — | — | — | 2 | 2 | 2 | 2 |
| | Vulcanization accelerator 1 | — | — | — | — | — | — | — | — | 2 | 2 | 2 | 2 |
| | Vulcanization accelerator 2 | — | — | — | — | — | — | — | — | 2 | 2 | 2 | 2 |
| | Sulfur | 1.5 | 1.5 | 1.5 | 1.5 | 1.5 | 1.5 | 1.5 | 1.5 | 1.5 | 1.5 | 1.5 | 1.5 |
| Evaluation result | Complex modulus E* when water-wet/ Complex modulus E* before water-wet × 100 | 90 | 91 | 93 | 93 | 91 | 91 | 91 | 91 | 100 | 100 | 100 | 100 |
| | Complex modulus E* after water-wet and dehydrated/Complex modulus E* before water-wet × 100 | 100 | 100 | 100 | 99 | 99 | 99 | 100 | 99 | 100 | 100 | 100 | 100 |
| | Complex modulus E* before water-wet (MPa) | 7.5 | 7.3 | 15.2 | 15.1 | 7.9 | 7.8 | 6.5 | 6.1 | 6.7 | 12.4 | 7.5 | 5.4 |
| | Volume when water-wet/ Volume before water-wet × 100 | 100 | 100 | 100 | 99 | 100 | 100 | 100 | 100 | 100 | 100 | 100 | 100 |
| | Wet grip performance | 106 | 107 | 110 | 109 | 108 | 107 | 112 | 113 | 95 | 100 | 96 | 99 |
| | Dry grip performance | 100 | 100 | 106 | 107 | 103 | 102 | 105 | 106 | 97 | 99 | 96 | 100 |
| | Fuel economy (rolling resistance) | 100 | 100 | 95 | 94 | 92 | 93 | 97 | 96 | 100 | 85 | 98 | 90 |

TABLE 3

| | | Example | | Comparative Example |
| --- | --- | --- | --- | --- |
| | | 3-1 | 3-2 | 3-1 |
| Amount (parts by mass) | Carboxylic acid-modified BR | 100 | 100 | — |
| | Carboxylic acid-modified SBR | — | — | — |
| | BR | — | — | 100 |
| | SBR | — | — | — |
| | 1,2-Dimethylimidazole | 3 | — | — |
| | 1-Butylimidazole | — | 3 | — |
| | Silica 1 | 30 | 30 | 30 |
| | Carbon black | 5 | 5 | 5 |
| | Stearic acid | — | — | 2 |
| | Zinc oxide | — | — | 2 |
| | Vulcanization accelerator 1 | — | — | 2 |
| | Vulcanization accelerator 2 | — | — | 2 |
| | Sulfur | — | — | 1.5 |
| Evaluation result | Complex modulus E* when water-wet/Complex modulus E* before water-wet × 100 | 94 | 94 | 100 |
| | Complex modulus E* after water-wet and dehydrated/Complex modulus E* before water-wet × 100 | 99 | 100 | 100 |
| | Complex modulus E* before water-wet (MPa) | 11.0 | 10.2 | 8.3 |
| | Volume when water-wet/Volume before water-wet × 100 | 100 | 100 | 100 |
| | Wet grip performance | 105 | 104 | 100 |
| | Dry grip performance | 100 | 100 | 100 |
| | Fuel economy (rolling resistance) | 100 | 100 | 100 |

Two or more of the indexes: wet grip performance (wet performance), dry grip performance (dry performance), and fuel economy in each table may be summed up to evaluate overall performance (for example, a sum of the wet grip performance index and the dry grip performance index for evaluating overall performance in terms of wet performance and dry performance, or a sum of the wet grip performance index, the dry grip performance index, and the fuel economy index for evaluating overall performance in terms of wet performance, dry performance, and fuel economy). The results show that the examples having a complex modulus E* that reversibly changes with water and satisfying relationships 1) to 3) were excellent in the overall performance.

The invention claimed is:

1. A rubber composition,
   comprising at least one selected from polybutadiene rubbers or styrene-butadiene rubbers, at least one selected from the group consisting of carboxylic acid-modified styrene-butadiene rubbers and carboxylic acid-modified polybutadiene rubbers, and at least one compound containing at least one selected from the group consisting of metal elements, metalloid elements, and a nitrogen element,
   having a complex modulus E* that reversibly changes with water, and
   satisfying the following relationships 1) to 3):

$$\text{Complex modulus } E^* \text{ when water-wet/Complex modulus } E^* \text{ before water-wet} \times 100 \leq 98 \qquad 1.$$

wherein E* represents the E* at 23° C. of the rubber composition;

$$99 \leq \text{Complex modulus } E^* \text{ after water-wet and dehydrated/Complex modulus } E^* \text{ before water-wet} \times 100 \leq 100 \qquad 2.$$

wherein E* represents the E* at 23° C. of the rubber composition;

$$99 \leq \text{Volume when water-wet/Volume before water-wet} \times 100 \leq 100 \qquad 3.$$

wherein Volume represents the volume at 23° C. of the rubber composition; and
wherein the rubber composition comprises carbon black, the carbon black being present in an amount of 5 parts by mass or less per 100 parts by mass of the rubber components.

2. The rubber composition according to claim 1, wherein rubber molecules of at least one rubber component are partially or fully cross-linked by ionic bonding.

3. The rubber composition according to claim 1, wherein the amount of carbon black is 1.0 to 15 parts by mass per 100 parts by mass of the rubber components, and the rubber composition further comprises, per 100 parts by mass of at least one rubber component therein, at least 1.0 part by mass of silica.

4. The rubber composition according to claim 1, comprising, per 100 parts by mass of at least one rubber component therein, 15 to 70 parts by mass of silica.

5. The rubber composition according to claim 1, comprising, per 100 parts by mass of at least one rubber component therein, 1 to 50 parts by mass of at least one resin.

6. The rubber composition according to claim 1, comprising, per 100 parts by mass of at least one rubber component therein, at least 15 parts by mass of at least one plasticizer.

7. The rubber composition according to claim 1, satisfying the following relationship with respect to a silica content and a plasticizer content each per 100 parts by mass of at least one rubber component in the rubber composition:
   Plasticizer content/Silica content <1.0.

8. The rubber composition according to claim 1, satisfying the following relationship with respect to a silica content and a resin content each per 100 parts by mass of at least one rubber component in the rubber composition:
   Resin content/Silica content <1.0.

9. The rubber composition according to claim 1, which is for use in treads.

10. A tire, comprising a tire component at least partially comprising the rubber composition according to claim 1.

11. A rubber composition, comprising at least one selected from polybutadiene rubbers or styrene-butadiene rubbers, and at least one compound selected from imidazole compounds, having a complex modulus E* that reversibly changes with water, and satisfying the following relationships 1) to 3):

$$\text{Complex modulus } E^* \text{ when water-wet/Complex} \atop \text{modulus } E^* \text{ before water-wet} \times 100 \leq 98 \qquad \qquad 1.$$

wherein E* represents the E* at 23° C. of the rubber composition;

$$99 \leq \text{Complex modulus } E^* \text{ after water-wet and dehy-} \atop \text{drated/Complex modulus } E^* \text{ before water-wet} \times \atop 100 \leq 100 \qquad \qquad 2.$$

wherein E* represents the E* at 23° C. of the rubber composition;

$$99 \leq \text{Volume when water-wet/Volume before water-} \atop \text{wet} \times 100 \leq 100 \qquad \qquad 3.$$

wherein Volume represents the volume at 23° C. of the rubber composition, wherein the rubber composition comprises carbon black, the amount of the carbon black per 100 parts by mass of the rubber components being 5 parts by mass or less, and rubber molecules of at least one rubber component are partially or fully cross-linked by ionic bonding.

12. The rubber composition according to claim 11, comprising, per 100 parts by mass of at least one rubber component therein, at least 1.0 part by mass of at least one selected from the group consisting of carbon black and silica.

13. The rubber composition according to claim 11, comprising, per 100 parts by mass of at least one rubber component therein, 15 to 70 parts by mass of silica.

14. The rubber composition according to claim 11, comprising:

at least one selected from the group consisting of carboxylic acid-modified styrene-butadiene rubbers and carboxylic acid-modified polybutadiene rubbers.

15. The rubber composition according to claim 11, comprising, per 100 parts by mass of at least one rubber component therein, 1 to 50 parts by mass of at least one resin.

16. The rubber composition according to claim 11, comprising, per 100 parts by mass of at least one rubber component therein, at least 15 parts by mass of at least one plasticizer.

17. The rubber composition according to claim 11, satisfying the following relationship with respect to a silica content and a plasticizer content each per 100 parts by mass of at least one rubber component in the rubber composition:

Plasticizer content/Silica content <1.0.

18. The rubber composition according to claim 11, satisfying the following relationship with respect to a silica content and a resin content each per 100 parts by mass of at least one rubber component in the rubber composition:

Resin content/Silica content <1.0.

19. The rubber composition according to claim 11, which is for use in treads.

20. A tire, comprising a tire component at least partially comprising the rubber composition according to claim 11.

\* \* \* \* \*